United States Patent
Akagawa et al.

(10) Patent No.: US 8,380,764 B2
(45) Date of Patent: Feb. 19, 2013

(54) FILE CONTROL SYSTEM AND FILE CONTROL COMPUTER FOR USE IN SAID SYSTEM

(75) Inventors: Etsutaro Akagawa, Kawasaki (JP); Akira Ito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 367 days.

(21) Appl. No.: 12/495,039

(22) Filed: Jun. 30, 2009

(65) Prior Publication Data

US 2010/0262637 A1  Oct. 14, 2010

(30) Foreign Application Priority Data

Apr. 13, 2009  (JP) .................................. 2009-097354

(51) Int. Cl.
*G06F 17/30* (2006.01)
(52) U.S. Cl. ...................................................... 707/822
(58) Field of Classification Search ........................ None
See application file for complete search history.

(56) References Cited

U.S. PATENT DOCUMENTS

| | | | | |
|---|---|---|---|---|
| 6,434,681 | B1 * | 8/2002 | Armangau | 711/162 |
| 6,708,227 | B1 * | 3/2004 | Cabrera et al. | 719/328 |
| 7,437,523 | B1 * | 10/2008 | Ting et al. | 711/161 |
| 7,496,694 | B2 * | 2/2009 | Balasubramanian et al. | 710/15 |
| 7,500,071 | B2 * | 3/2009 | Boyd et al. | 711/163 |
| 7,577,692 | B1 * | 8/2009 | Corbett et al. | 1/1 |
| 7,636,744 | B1 * | 12/2009 | Aggarwal et al. | 1/1 |
| 2002/0133539 | A1 | 9/2002 | Monday | |
| 2004/0068636 | A1 * | 4/2004 | Jacobson et al. | 711/203 |
| 2005/0066076 | A1 | 3/2005 | Best et al. | |
| 2005/0216535 | A1 * | 9/2005 | Saika et al. | 707/204 |
| 2005/0228944 | A1 * | 10/2005 | Homma et al. | 711/114 |
| 2005/0257014 | A1 * | 11/2005 | Maki et al. | 711/162 |
| 2006/0218364 | A1 * | 9/2006 | Kitamura | 711/162 |
| 2006/0259725 | A1 | 11/2006 | Saika et al. | |
| 2007/0094464 | A1 * | 4/2007 | Sharma et al. | 711/162 |
| 2007/0168404 | A1 * | 7/2007 | Nakamura et al. | 707/204 |

(Continued)

FOREIGN PATENT DOCUMENTS

| | | |
|---|---|---|
| JP | 2004-342050 | 12/2004 |
| JP | 2005-011316 | 1/2005 |

(Continued)

OTHER PUBLICATIONS

W. Curtis Preston, "SAN & NAS Storage Network Management," Oct. 31, 2002, pp. 101-109.

*Primary Examiner* — Anteneh Girma
(74) *Attorney, Agent, or Firm* — Foley & Lardner LLP

(57) ABSTRACT

A situation where, even though a file system set with an additional function has been expanded, the additional function is unable to operate is prevented from occurring. Provided are a file control computer and its system having a main computer including a file system for managing reading and writing of data between the client computer and the storage device, a control circuit for controlling the file system, and a memory circuit for storing management information of the file system. The memory circuit stores setting information which is set with an additional function that is set to the file system, and a condition necessary for operating the additional function. Upon expanding the file system based on the management information, the control circuit determines a status of fulfillment of the condition in the expanded file system, and outputs warning information if the determination result denies fulfillment of the condition.

8 Claims, 21 Drawing Sheets

U.S. PATENT DOCUMENTS

| | | |
|---|---|---|
| 2007/0180208 A1* | 8/2007 | Yamasaki ................. 711/162 |
| 2007/0220071 A1 | 9/2007 | Anzai et al. |
| 2007/0220322 A1* | 9/2007 | Mikami ..................... 714/13 |
| 2007/0233978 A1 | 10/2007 | Nakano et al. |
| 2007/0255925 A1 | 11/2007 | Serizawa et al. |
| 2009/0055608 A1* | 2/2009 | Yamasaki ................. 711/162 |

FOREIGN PATENT DOCUMENTS

| JP | 2005-292952 | 10/2005 |
|---|---|---|

* cited by examiner

FIG.4

| ADDITIONAL FUNCTION NAME (161) | RESERVED CAPACITY (162) | CONDITION (163) |
|---|---|---|
| DIFFERENTIAL SNAPSHOT | 10.00GB | LARGER THAN PRIMARY VOLUME |
| VOLUME MIRROR | 20.00GB | EQUAL TO PRIMARY VOLUME |
| DIFFERENTIAL VOLUME MIRROR | 40.00GB | LARGER THAN PRIMARY VOLUME |
| ... | | |

| ADDITIONAL FUNCTION NAME (161) | INSUFFICIENT CAPACITY (321) |
|---|---|
| DIFFERENTIAL SNAPSHOT | 10.00GB |
| VOLUME MIRROR | 20.00GB |
| DIFFERENTIAL VOLUME MIRROR | 40.00GB |
| ... | |

| ADDITIONAL FUNCTION NAME ~161 | RESERVED CAPACITY ~162 | CONDITION ~163 | PRIORITY ~164 | PRE-PROCESSING ~165 | POST-PROCESSING ~166 |
|---|---|---|---|---|---|
| DIFFERENTIAL SNAPSHOT | 10.00GB | LARGER THAN PRIMARY VOLUME | 1 | freezefs | unfreezefs |
| VOLUME MIRROR | 20.00GB | EQUAL TO PRIMARY VOLUME | 2 | - | - |
| DIFFERENTIAL VOLUME MIRROR | 40.00GB | LARGER THAN PRIMARY VOLUME | 3 | freezefs | unfreezefs |
| ... | | | | | |

| FILE SYSTEM NAME | PRIORITY | THRESHOLD VALUE | EXPANDED CAPACITY |
|---|---|---|---|
| filesystem_1 | 1 | 80% | 40% |
| filesystem_2 | 2 | 90% | 100GB |
| filesystem_3 | 3 | 20GB | 10% |
| ... | | | |

FIG.17

| FILE SYSTEM NAME | COPY DESTINATION COMPUTER |
|---|---|
| filesystem_1 | 192.168.1.2 |
| filesystem_2 | remote1 |
| filesystem_3 | 192.168.1.3 remote2 |
| ... | |

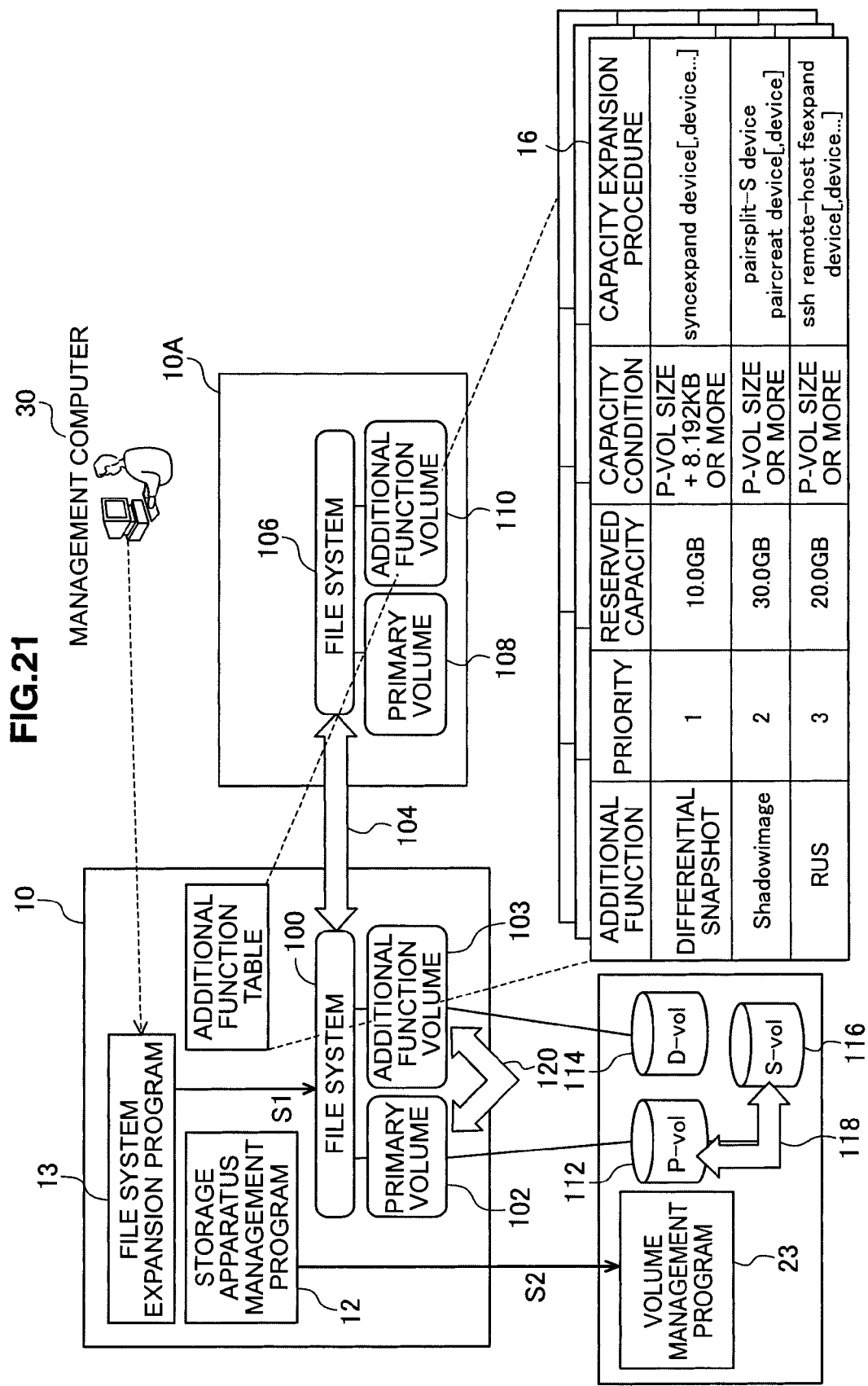

FILE CONTROL SYSTEM AND FILE CONTROL COMPUTER FOR USE IN SAID SYSTEM

CROSS REFERENCES

This application relates to and claims priority from Japanese Patent Application No. 2009-97354, filed on Apr. 13, 2009, the entire disclosure of which is incorporated herein by reference.

BACKGROUND

The present invention generally relates to a file control system and a file control computer for use in such file control system, and in particular relates to a NAS system.

In recent years, since the capacity of files being used in corporations and the like is increasing drastically, the use of a NAS (Network Attached Storage) as a storage apparatus for storing files is becoming widespread.

A NAS includes a file system as a function for storing files in a memory device. A NAS creates storage areas (hereinafter also referred to as "volumes") that are required in the file system from a storage medium such as an HDD (Hard Disk Drive). An administrator estimates the storage capacity that will be required in the file system before starting a NAS operation, and creates a volume of that storage capacity in the file system in advance.

Nevertheless, under the current circumstances where it is inevitable to drastically increase the capacity of a file system, it is difficult for an administrator to accurately estimate the storage capacity that is required in the file system in advance. To begin with, the allocation of a large capacity to a file system will lead to the wasted use of the storage medium.

Thus, Japanese Patent Laid-Open Publication No. 2005-11316 (Patent Document 1) discloses technology of automatically expanding the capacity of a file system according to the usage frequency of the storage capacity in the file system. With this technology, since a volume is automatically expanded in accordance with the capacity that is currently required by the file system, an administrator is not required to strictly estimate the capacity that is required in the file system.

Meanwhile, a significant feature of a NAS file system is that, in addition to the basic function of storing files, it includes functions (hereinafter referred to as the "additional functions") that improve the administrator's convenience by managing the history and replication of files. For instance, Japanese Patent Laid-Open Publication No. 2004-342050 (Patent Document 2) discloses technology of storing images of a file system at a certain point in time. In addition, Japanese Patent Laid-Open Publication No. 2005-292952 (Patent Document 3) discloses technology of transferring contents of a file system to a remote site.

Moreover, "SAN & NAS Storage Network Management" by W. Curtis Preston, p. 108, Oreilly Japan, Oct. 30, 2002 (Non-Patent Document 1) discloses technology of realizing the mirroring of the file system through collaboration of the volume mirroring technology of the storage apparatus and the file system.

SUMMARY

With A NAS, it is necessary to allocate reasonable storage capacity to additional functions in accordance with the capacity of a file system in order to enable the additional functions together with the file system. For example, with the remote copy technology described in Patent Document 3, the capacity of the copy destination file system needs to be greater than the capacity of the copy source file system.

If the capacity of a file system comprising such additional function is simply expanded with the technology described in Patent Document 1, the storage capacity will be insufficient for expanding the additional function to be comparable with the expansion of the file system, and, consequently, there is a problem in that, although the file system can be expanded, the additional function will not operate.

Moreover, if the NAS file system is set with a plurality of additional functions, the importance of such additional functions is often different. Thus, for example, although the importance of a plurality of additional functions was different for each operational policy of the system, conventionally, the additional functions were not expanded while taking note of the importance of such additional functions upon expanding the file system.

In light of the above, an object of the present invention is to provide a file control system and a file control computer for use therein capable of preventing a situation from occurring where, even though a file system set with additional functions has been expanded, the additional functions are unable to operate.

In order to achieve the foregoing object, the present invention provides a file control computer and its system having a main computer including a file system for managing reading and writing of data between a client computer and a storage device, a control circuit for controlling the file system, and a memory circuit for storing management information of the file system. The memory circuit stores setting information which is set with an additional function that is set to the file system, and a condition necessary for operating the additional function. Upon expanding the file system based on the management information, the control circuit determines a status of fulfillment of the condition in the expanded file system, and outputs warning information if the determination result denies fulfillment of the condition.

According to the present invention, it is possible to provide a file control system and a file control computer for use therein capable of preventing a situation from occurring where, even though a file system set with additional functions have been expanded, the additional functions are unable to operate.

DESCRIPTION OF DRAWINGS

FIG. 4 is a block diagram of an additional function table shown in FIG. 1;

FIG. 5 is a block diagram of a processing result table shown in FIG. 1;

FIG. 8 is a block diagram of an additional function table shown in FIG. 1;

FIG. 13 is a configuration diagram of a file system table according to the third embodiment as a block diagram according to an example of the file system table;

FIG. 17 is a block diagram showing an example of a remote copy table;

FIG. 21 is a functional block diagram of the file control system according to the present invention.

DETAILED DESCRIPTION

The present invention is now explained below. Incidentally, the subsequent explanation uses expressions such as "xxx table" and "xxx list" in order to explain the information of the present invention, but such information does not necessarily have to be expressed as a data structure of a table, a list or the like. Thus, in order to show that the information is not dependent on a data structure, the expressions of "xxx table," "xxx list" and the like are sometimes referred to as "xxx information."

Although the subsequent explanation sometimes uses the term "program" as a subject, since a program performs prescribed processing while using a memory and a communication port (network interface) as a result of being executed by a CPU (sometimes referred to as a processor), the explanation may also be provided with the CPU as a subject. In addition, the processing that is disclosed with a program as the subject may also be explained as the processing to be performed by a computer such as a management server or an information processing unit. Moreover, all or a part of the program may be realized with a dedicated hardware. The various programs may also be installed in the respective computers by way of a program distribution server or storage media.

Figure 1:
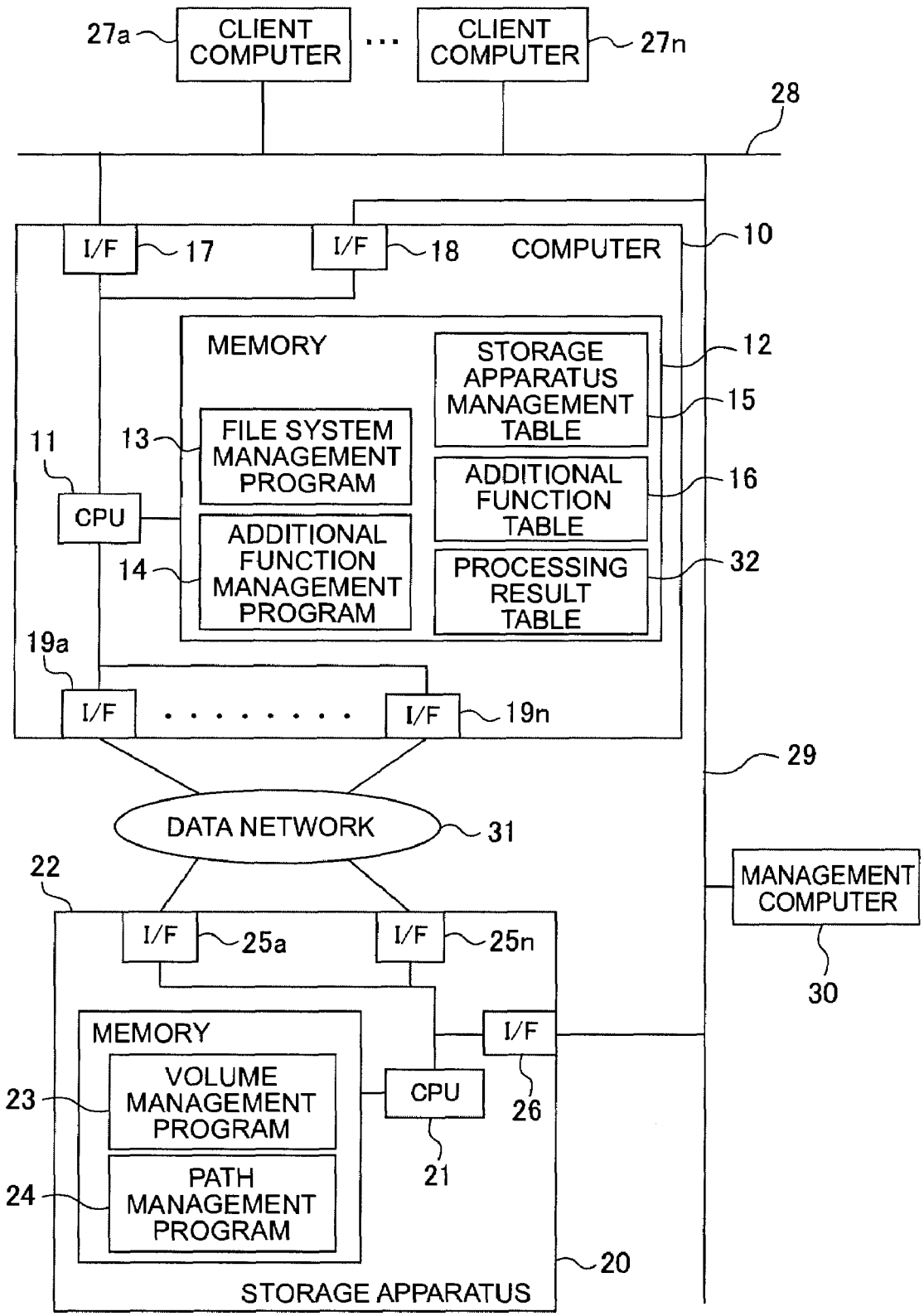
FIG. 1 is a hardware block diagram showing an example of a file control system according to the present invention.

Embodiments of the present invention are now explained with reference to the attached drawings. FIG. 1 shows the outline of a file control computer system according to the present invention. The computer system realizes a NAS. The computer system comprises a main computer 10, client computers (host, server, etc.) 27 connected thereto, and a storage apparatus 20 and a management computer 30 connected to the computer 10.

The computer 10 comprises a CPU 11, a memory 12, a network interface 17 (hereinafter referred to as the "network I/F 17"), a management interface 18 (hereinafter referred to as the "management I/F 18"), and data interfaces 19a to 19n (hereinafter referred to as the "data I/F 19").

The memory 12 stores, as management or control information related to file systems, a file system management program 13, an additional function management program 14, a storage apparatus management program 15, an additional function table 16, and a processing result table 32. The computer 10 uses the CPU 11 and executes the programs 13, 14 and 15. The file system management program 13 executes processing to the file system from the client apparatus 27 or the management computer 30. As specific examples of processing, there is expanding of a file system, shrinking a file system, mounting of a file system on the client apparatus 27 or the computer 10, or the unmounting of the mounted file system. The additional function management program 14 executes processing to the additional function.

As specific examples of processing, there are enabling and disabling the additional functions, expanding and shrinking volumes necessary for the additional functions, storing images of the file system, remote copy and the like. Additional functions are an aggregate of special functions that are added to the reading and writing function of data with the client apparatus that is dependent on the file system, and, for example, as described later, usually consists of a plurality of element technologies including a differential snapshot as technology of storing an image of the file system at a certain point in time, volume mirror as technology of synchronizing the contents of two or more volumes, differential volume mirror as technology of storing an image of a volume at a certain point in time. Volumes are usually allocated to each element technology, and the additional functions are realized by the additional function management program executing the I/O control of data to the foregoing volumes.

The storage apparatus management program 15 operates functions of the storage apparatus; specifically, allocation of volumes to the file system and the like.

The computer 10 is connected to the management computer 30 via the management network 29. The computer 10 receives commands from the management computer 30 and sends the processing result to the management computer 30.

Moreover, the computer 10 is connected to the client apparatuses 27a to 27n via the operation network 28, and the computer 10 receives requests from the client apparatuses 27 and sends the processing result.

As preferable examples of the operation network 28 and the management network 29, there are the Ethernet (registered trademark) and Fibre Channel. If the network configuration is to be simplified, the operation network 28 and the management network 29 may be used combinedly.

The storage apparatus 20 comprises a CPU 21, a memory 22, data interfaces 25a to 25n, a management interface 26, and a plurality of storage mediums (HDD, SSD, etc.) (not shown).

The memory 22 stores a volume management program 23 and a path management program 24. The storage apparatus 20 uses the CPU 21 to execute the programs 23 and 24.

The storage apparatus 20 is connected to the computer 10 via the data network 31, and the storage apparatus 20 receives data I/O requests from the computer 10, and sends the processing result to the computer 10.

Figure 2:
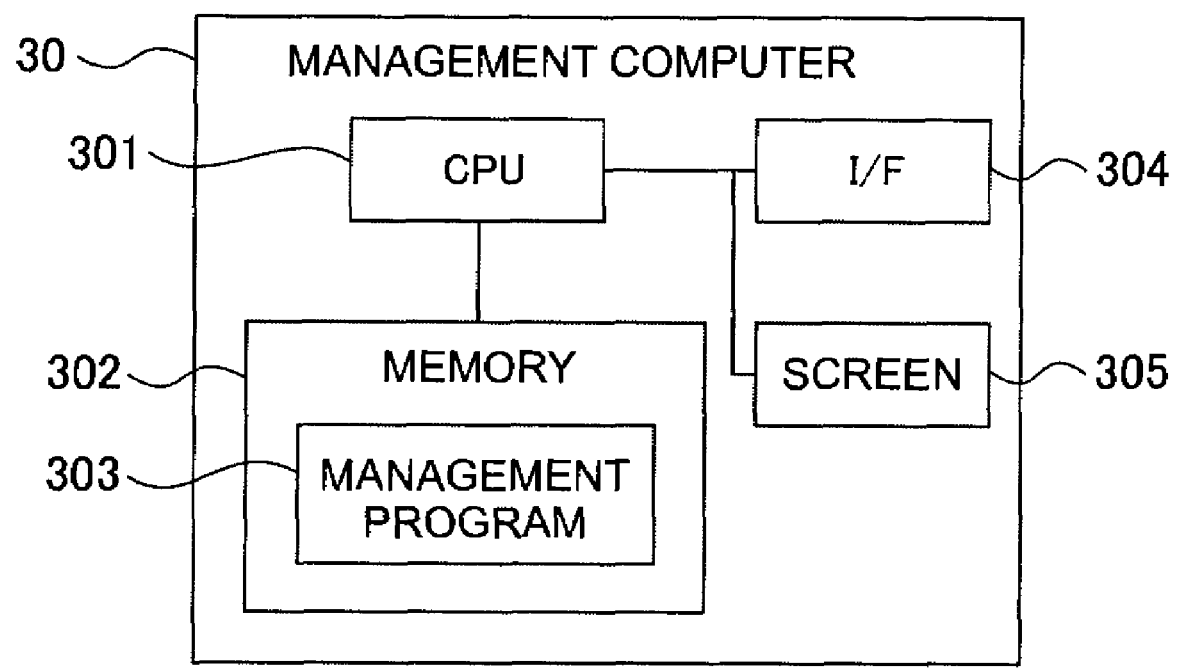
FIG. 2 is a hardware block diagram of a management computer.

FIG. 2 is a hardware block diagram of the management computer 30. The management computer 30 uses the CPU 301 to execute the management program 303 of the memory 302, and manages the computer 10 and the storage apparatus 20 connected to the management network 29 via the I/F 304. The management computer 30 also provides to an administrator a management screen 305 as an interface for the administrator to use the management program 303.

Incidentally, the management computer may be omitted by the management program 303 being stored in the memory 12 of the computer 10 and the CPU 11 executing the management program.

FIG. 21 is a functional block diagram explaining the details of the file system in the computer system. The file system 100 of the computer 10 is allocated with a primary volume 102 as an access destination of the client's read/write command, and an additional function volume 103 storing a differential snapshot (an example of the additional function) of the primary volume.

The storage apparatus 20 comprises a P-vol (112), a D-vol (114), and an S-vol (116) as a copy volume of the P-vol (112). The P-vol (112) is mapped to the primary volume 102, and the D-vol (114) is mapped to the differential snapshot volume 103. Moreover, the S-vol (116) corresponds with the P-vol (112). A volume (vol) is a logically defined storage area. The volume is allocated with a storage area from the storage device.

The storage apparatus 20 stores the association of the volumes as a mapping table, and the volume management program 23 controls the transfer of data between the volumes based on this table. The mapping table is also recorded in a prescribed area of the memory 12 of the computer 10.

Reference numeral 10A represents another computer at a remote location that configures a remote site in relation to the computer 10, and includes a file system 106 comprising a primary volume 108 and an additional function volume 110.

The file system expansion program 13 of the computer 10 sends an expansion command S1 of the file system to the file system 100, and the storage apparatus management program 12 sends to the volume management program 23 of the storage apparatus a volume creation command and a command for allocating a volume to the file system of the computer 10. The storage management program receives the volume creation command and expands the capacity of the P-vol (118) as the storage area of the primary volume 102, and additionally expands the capacity of the D-vol (114) as the storage area of the additional function volume 103.

The file system 100 manages the reading and writing of data between the client computer 27 and the storage device of the storage apparatus 20.

Figure 3:
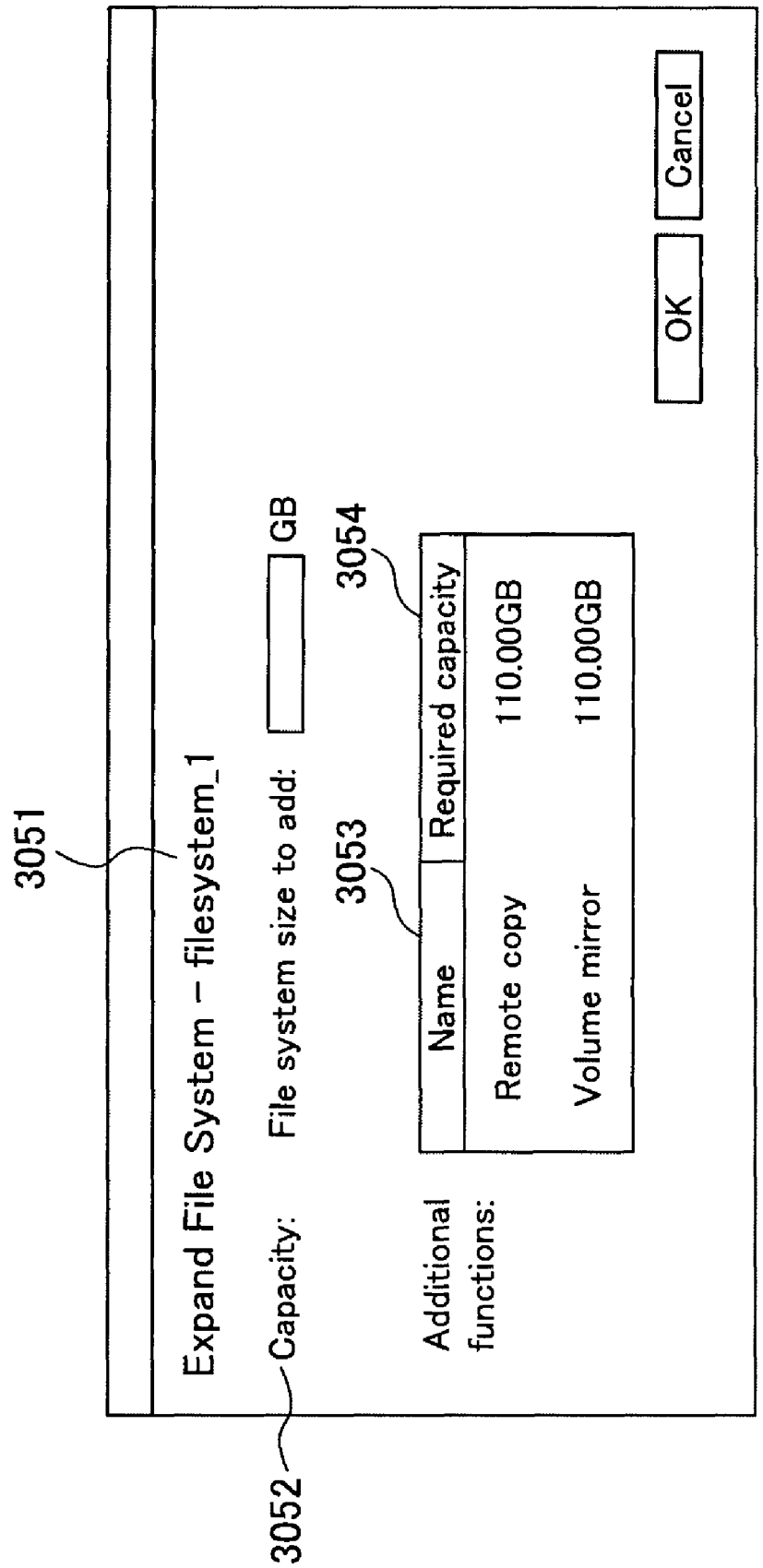
FIG. 3 is a GUI of the management computer and an input block diagram for expanding a file system.

FIG. 3 shows an example of a GUI (Graphical User Interface) to be displayed to the administrator on the screen 305 of the management computer 30 when the administrator is to select the file system to be expanded. The GUI includes at least an area 3051 for displaying the file system name that is selected by the administrator, an area 3052 for the administrator to input the storage capacity to be expanded, an area 3053 for displaying the additional function name that is set in the file system, and an area 3054 for displaying the necessary capacity of the respective additional functions.

If a value is input to the area 3052, the file system management program 13 expands the storage capacity of the primary volume 102 in the amount corresponding to the input value. The area 3054 is the overall capacity of the respective additional functions that is required after the expansion of the file system. In FIG. 3, the numerical values indicated in the area 3054 are examples.

[First Embodiment]

In this embodiment, if the capacity required for the additional functions is insufficient when the administrator is to expand the file system that is set with such additional functions, a warning is displayed to the administrator. FIG. 4 shows an example of the additional function table 16. The additional function table 16 includes at least an additional function name 161, a storage capacity 162 (hereinafter referred to as the "reserved capacity 162") that is currently being reserved by the computer 10 for the additional functions, and a condition 163 of the capacity that is required for operating the additional functions. The reserved capacity corresponds to the storage capacity of the volume in the storage apparatus that is allocated to the additional function volume 103 (FIG. 2).

The additional function name 161 may be an identifier capable of differentiating the plurality of additional functions, and, for instance, the product name of the additional function can be suitably used. As an example of the reserved capacity 162, examples such as the number of bytes, number of blocks, number of files and the like that are currently being reserved for the additional functions may be preferably used.

In the example shown in FIG. 4, the additional functions include a differential snapshot, a volume mirror, and a differential volume mirror. The computer 10 includes an additional function volume for each of the plurality of additional functions, and mutually different real volumes of the storage apparatus 20 are allocated to the respective additional function volumes. Incidentally, a plurality of additional function volumes may also be allocated to a common real volume.

The condition 163 specifically indicates the condition for operating the additional function and the formula for calculating the capacity of the additional function based on the capacity of the file system that is set with such additional function. If the additional function volume requires a capacity that is larger than the capacity of the primary volume, subject matter to the effect of "larger than primary volume" is registered.

FIG. 5 shows an example of the processing result table 32. The processing result table is a table that lists the insufficient storage capacity for each of the plurality of additional functions in a case where the file system management program 13 of the computer 10 is to expand the file system and, although it was possible to expand the primary volume, there was a shortage in the storage capacity upon the additional function management program 14 expanding the capacity of the additional function volume. The processing result table 32 includes at least an additional function name 161, and a capacity 321 that is insufficient for operating the additional function.

Figure 6:
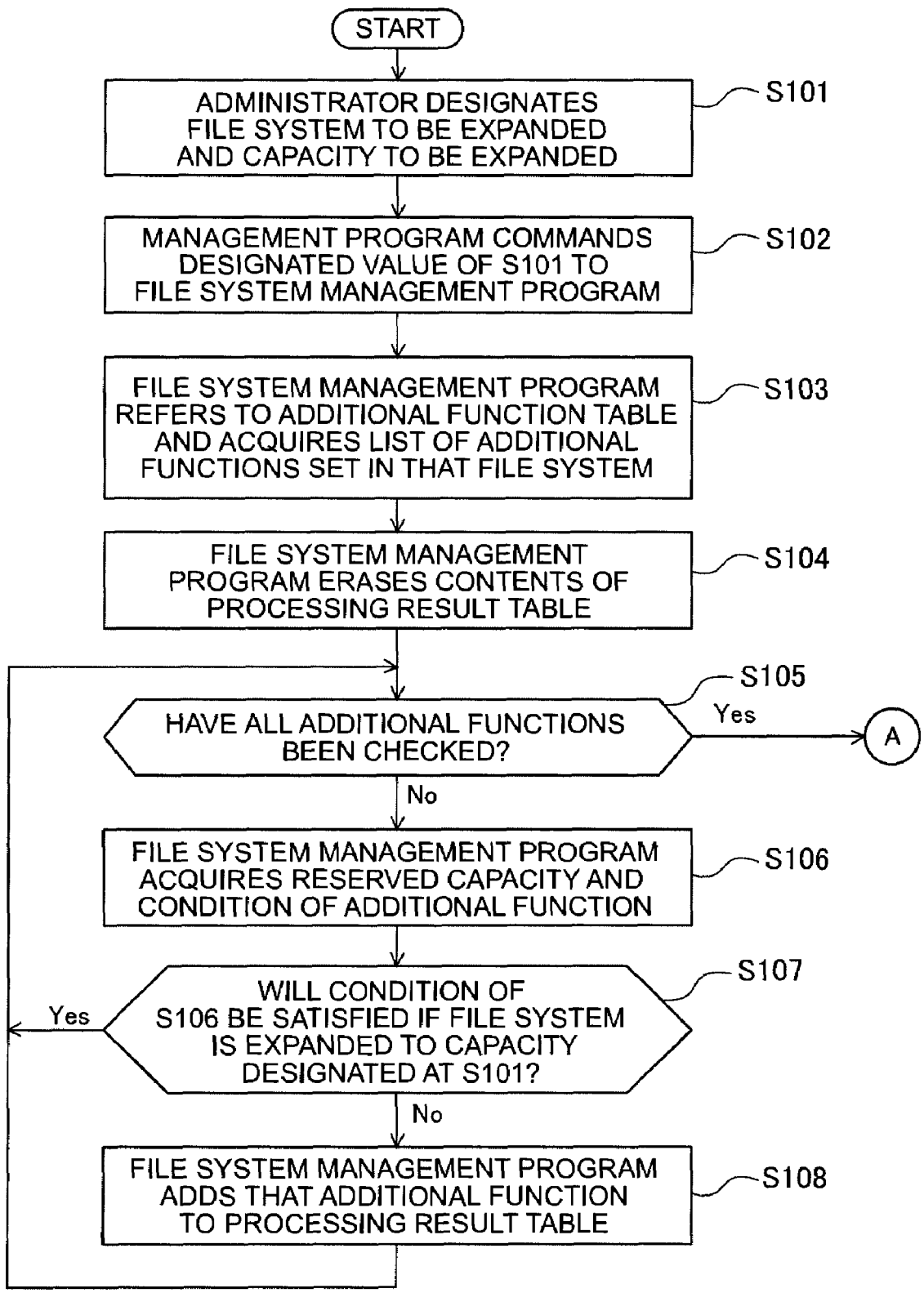
FIG. 6 is a first flowchart showing a processing routing of a warning display during the expansion processing of a file system.
Figure 7:
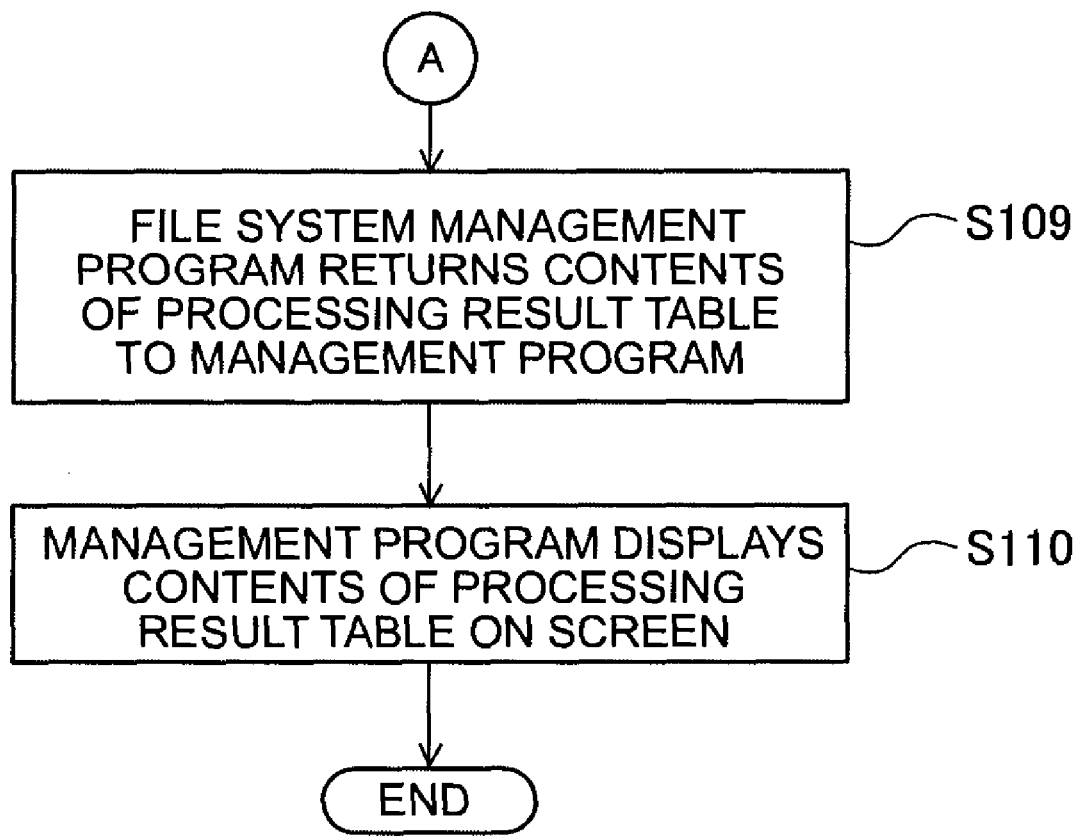
FIG. 7 is a second flowchart to be connected to the first flowchart.

FIG. 6 and FIG. 7 are flowcharts showing the processing routine in the present embodiment. Foremost, the administrator designates the file system to be expanded and the capacity to be expanded (hereinafter referred to as the "expansion capacity") to the management program 303 of the management computer 30 (S101). Specifically, the administrator selects the file system to be expanded and inputs the desired value as the expansion amount in the area 3052 of the screen 305 of the GUI (FIG. 3).

Subsequently, the management program 303 commands the file system management program 13 to expand the file system based on the value input at S101 (S102). The file system management program 13 thereafter refers to the additional function table 16 and acquires a list of the additional functions that are set in the file system (S103). The additional function table is created and updated by the management computer 30.

Subsequently, the file system management program 13 erases the old contents in the processing result table 32 (S104).

Subsequently, the file system management program 13 implements the processing of S106 to S108 to all additional functions acquired at S103 (S105).

The file system management program 13 refers to the additional function table 16 and acquires the reserved capacity 162 of the additional functions and the condition 163 of the additional functions (S106).

The file system management program 13 determines whether the condition of S106 is fulfilled if the file system is expanded to the capacity designated at S101; for example, whether the reserved capacity of the additional functions is greater than the capacity of the expanded primary volume.

If the condition 163 is fulfilled (S107: Yes), the routine returns to S105. If the condition 163 is not fulfilled (S107: No), the file system management program 13 writes the name of the additional function in the additional function name 161 of the processing result table 32, and additionally writes the capacity that is insufficient for fulfilling the condition 163 in the processing result table (S108). An example of the insufficient capacity is a value that is obtained by subtracting the reserved capacity of the additional functions from the capacity of the expanded file system. The file system management program returns to S105 after S108.

When the file system management program implements the processing of S106 to S108 regarding all additional functions (S105: Yes), it returns the contents of the processing result table 32 to the management program 303 (S109).

Finally, the management program 303 displays the contents of the processing result table 32 on the screen, and warns the administrator of the insufficiency in the capacity of the additional functions upon expanding the file system (S110). This warning may be made, for example, by means such as changing the display color of or flashing the area 3053 corresponding to the additional function name that is displayed on the processing result table 32. The processing is thereby ended.

According to this embodiment, if an administrator attempts to expand or expands the file system that is set with additional functions and the storage device is short on capacity that is sufficient for expanding the additional functions in accordance with the expansion of the file system, a warning is displayed to the administrator.

Accordingly, since the administrator will be able to notice the insufficiency of the capacity necessary for the additional functions upon expanding the file system, a situation where the additional function is unable to operate after the expansion of the file system can be prevented from occurring.

[Second Embodiment]

In this embodiment, if the capacity required for expanding a plurality of additional functions is insufficient when the administrator is to expand the file system that is set with such additional functions, the capacity is automatically allocated to the additional functions in descending order of priority according to the priority set forth by the administrator for the expansion of such additional functions.

FIG. 8 shows an example of the additional function table 16 that is applied in this embodiment. The additional function table 16 includes at least an additional function name 161, a capacity 162 that is currently being reserved by the additional function management program 14 of the computer 10 for the additional functions, a condition 163 of the capacity required for operating the additional functions, and a priority 164 of the additional functions.

As an example of assigning a priority 162, a positive integer value may be assigned to the additional functions in descending order of priority. Pre-processing 165 to be performed before expanding capacity to the additional functions and post-processing 166 to be performed after expanding capacity to the additional functions may also be registered in the additional function table.

As an example of pre-processing 165, while the capacity is being expanded, the CPU 11 may temporarily stop (freeze) the file system in order to inhibit data from being input to and output from the additional function volume. As an example of post-processing 166, there is the processing of resuming the temporarily stopped (frozen) file system.

Figure 9:
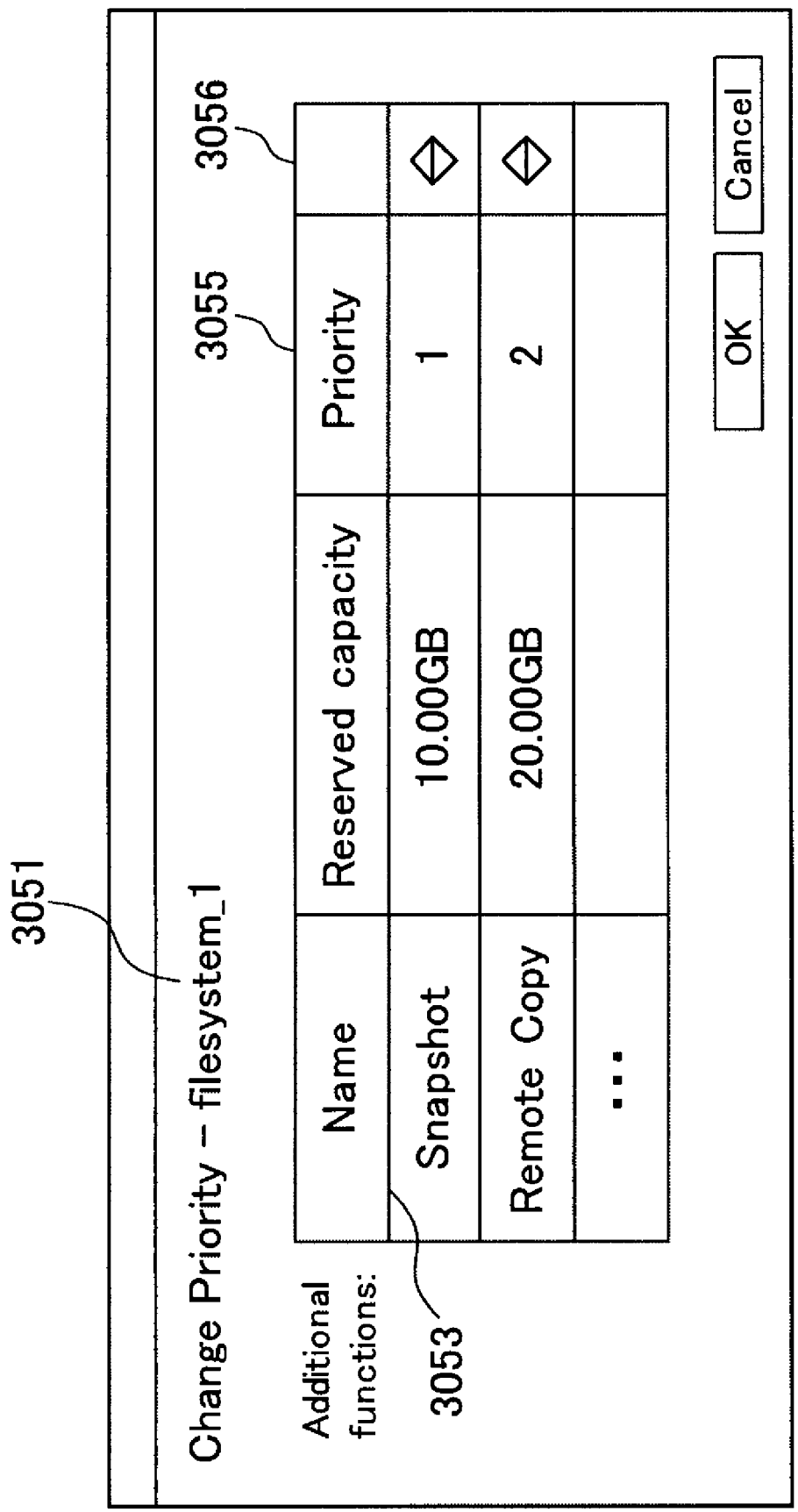
FIG. 9 is a block diagram of an input GUI for changing the priority of the additional function.

FIG. 9 shows an example of the GUI to be displayed on the screen 305 of the management computer 30 for the administrator to select the file system and then set or change the priority of the additional functions belonging to that file system. The GUI includes an area 3051 displaying the file system name selected by the administrator, an area 3053 for displaying the additional function name set in the file system, an area 3055 for displaying the priority for each additional function, and a button 3056 as the operation means for increasing or decreasing the priority.

Figure 10:
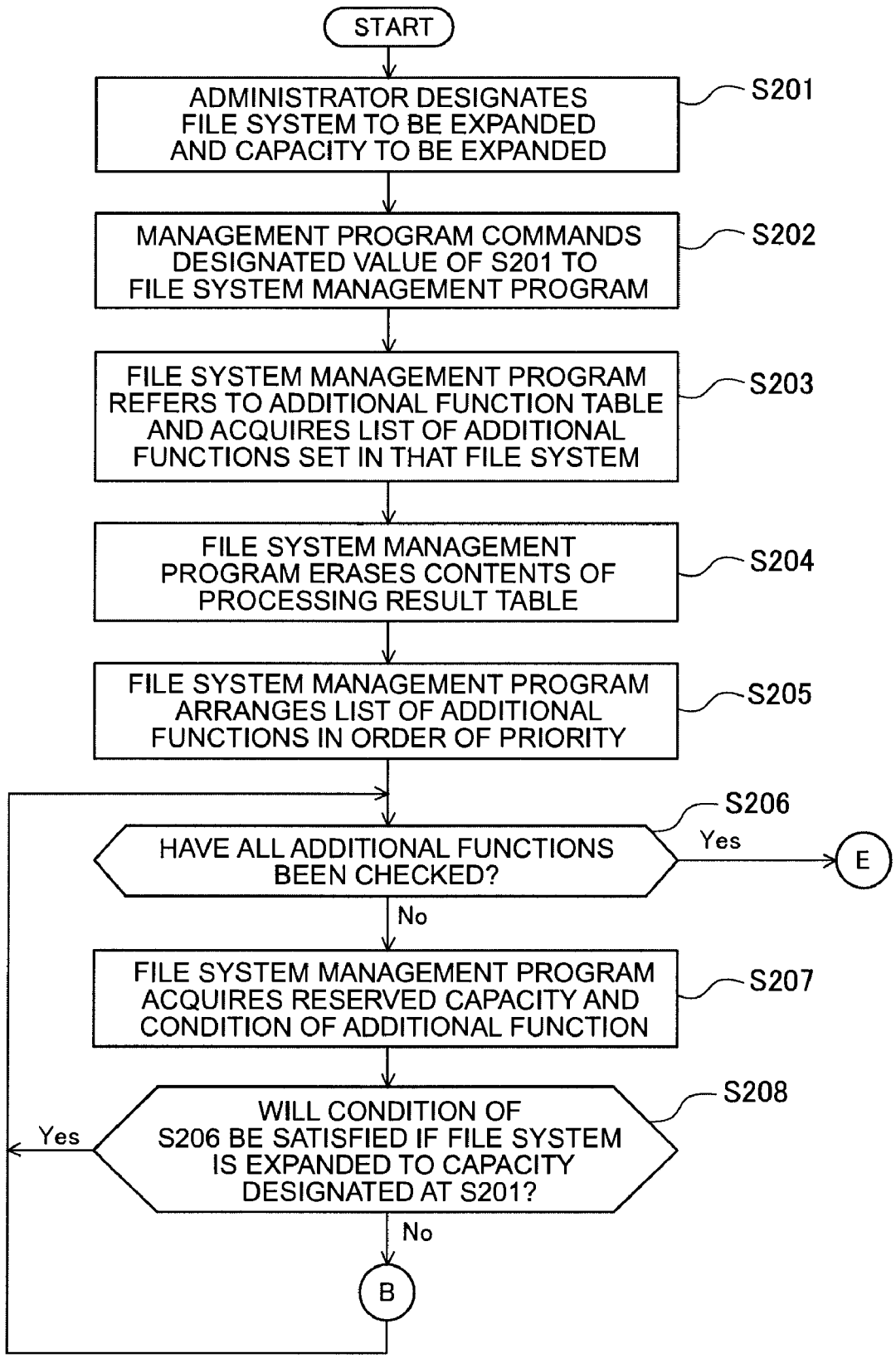
FIG. 10 is a first flowchart explaining the processing for expanding the capacity of the additional function according to the priority.
Figure 11:
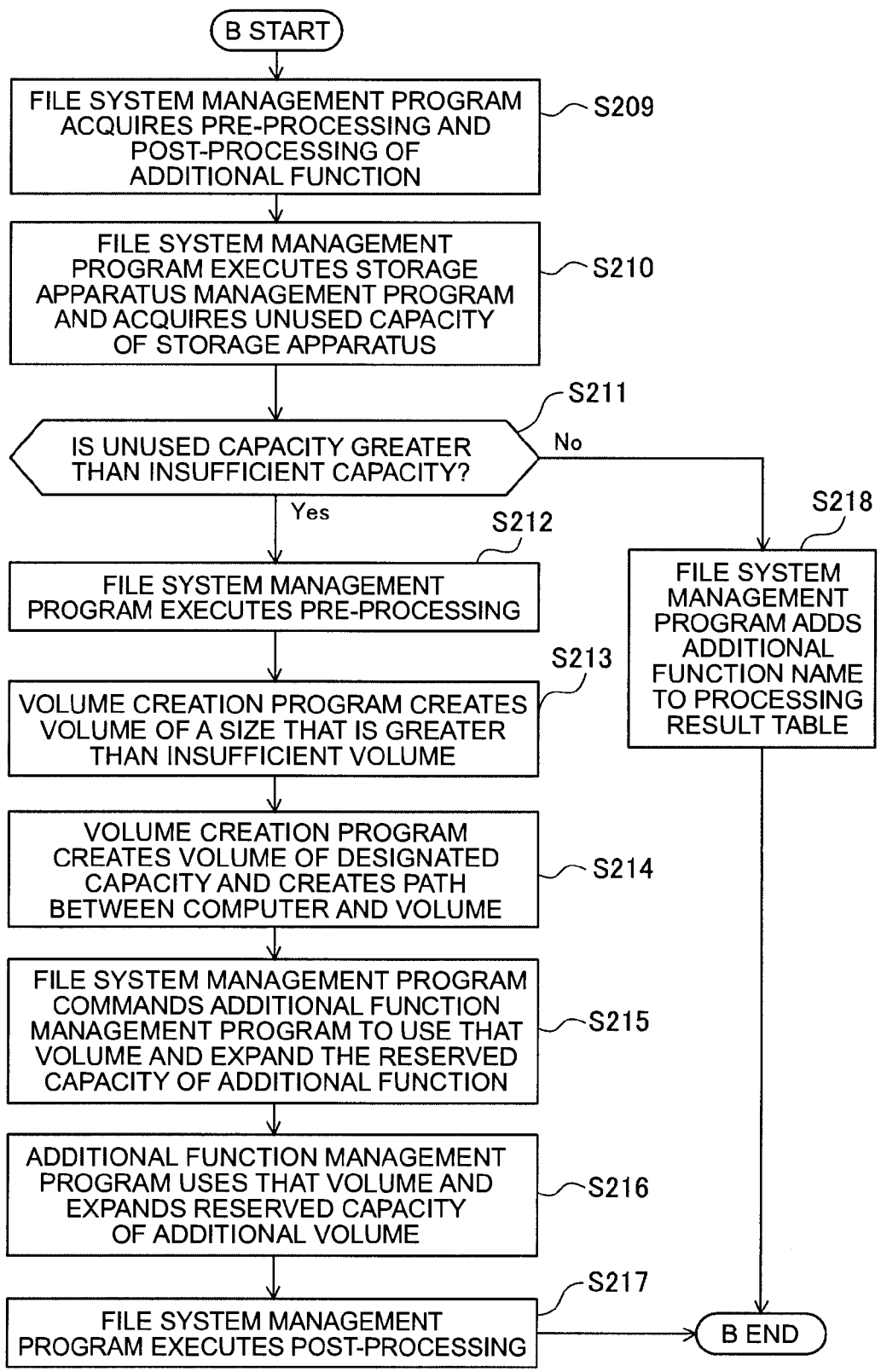
FIG. 11 is a second flowchart to be connected to the first flowchart.

FIG. 10 and FIG. 11 are flowcharts explaining the processing of expanding the additional function according to the priority. The administrator designates the file system to be expanded and the capacity to be expanded (hereinafter referred to as the "expansion capacity") to the management program 303 of the management computer 30 (S201). Specifically, the administrator inputs the file system to be expanded and inputs the capacity (desired value) to be expanded in the screen provided by the GUI (refer to FIG. 3).

Subsequently, the management program 303 commands the file system management program 13 to expand the file system based on the value input at S201 (S202). The file system management program 13 thereafter refers to the additional function table 16 and acquires a list of the additional functions that are set in the file system (S203). The file system management program 13 erases the old contents in the processing result table 32 (S204).

The file system management program 13 arranges the list of additional functions acquired at S203 in descending order of priority (refer to FIG. 9) that was input by the administrator (S205).

Subsequently, the file system management program 13 performs the processing of S207 to S208 and B to all additional functions that were arranged at S205 (S206).

Foremost, file system management program 13 refers to the additional function table 16 and acquires the reserved capacity 162 of the additional functions and the condition 163 of the additional functions (S207).

Subsequently, the file system management program 13 determines whether the condition of S207 is fulfilled if the file system is expanded to the capacity designated at S201; for example, whether the reserved capacity of the additional functions is greater than the capacity of the expanded primary volume.

If the condition 163 is fulfilled (S208: Yes), the routine returns to S206. If the condition 163 is not fulfilled (S208: No), the file system management program 13 acquires the pre-processing 165 and the post-processing 166 of the additional functions (S209 of FIG. 11). Here, the capacity that is required for fulfilling the condition 163 is stored as the insufficient capacity in a prescribed area of the memory 12. The file system management program 13 thereafter executes the storage apparatus management program 15 and acquires the unused capacity existing the storage devices (HDD, etc.) of the storage apparatus from the volume management program 23 of the storage apparatus 20 (S210).

Subsequently, the file system management program 13 determines whether the unused capacity acquired at S210 is greater than the insufficient capacity (S211). If the unused capacity is less than the insufficient capacity (S211: No), the volume management program 23 notifies the result to the file system management program 13 via the storage apparatus management program 15. The file system management program 13 registers the additional function name and the insufficient capacity in the processing result table 32 (S218).

If the file system management program 13 obtains a positive result in the determination at S211 (S211: Yes), the file system management program 13 executes the pre-processing 165 (S212). The file system management program 13 commands the volume management program 23 via the storage apparatus management program 15 to create a volume (volume to be mapped to the additional function) of a size that is greater than the insufficient capacity, or expand the capacity of the existing volume (S213).

The file system management program 13 sets a logical path between the computer 10 and the created volume in the path management program 24 via the storage apparatus management program 15 so as to enable access to the created volume from the computer 10 (S214).

Subsequently, the file system management program 13 commands the additional function management program 14 to expand the reserved capacity of the additional functions by allocating the volume itself to the additional function or allocating a part of the area of the volume to the additional function (S215). The additional function management program 14 expands the capacity to be reserved for the additional functions based on the volume (S216). Subsequently, the file system management program 13 executes the post-processing 166 (S217), and returns to S206.

Figure 20:
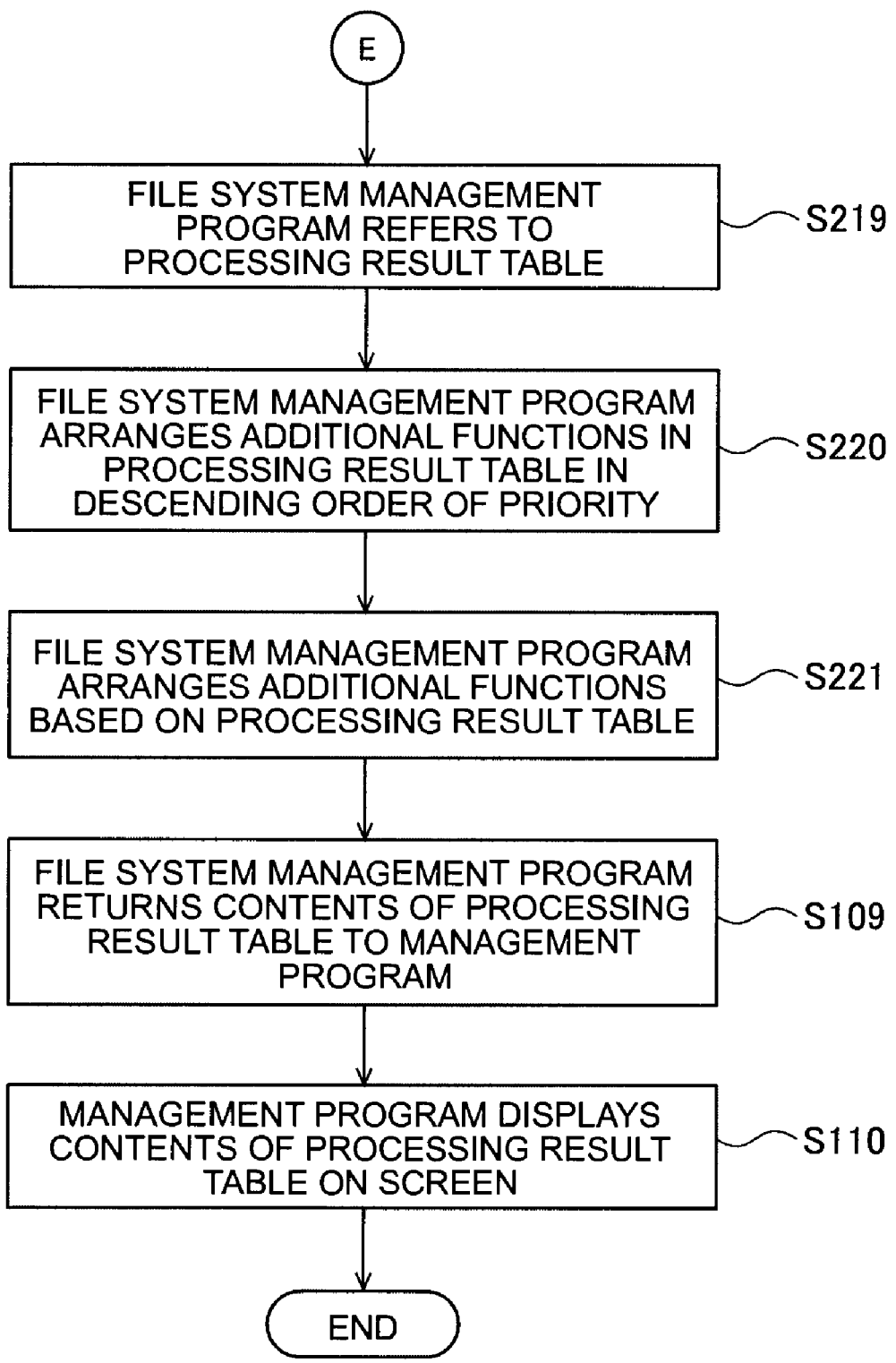
FIG. 20 is a third flowchart to be connected to the flowchart of FIG. 10 explaining the processing for expanding the capacity of the additional function according to the priority.

If the file system management program 13 completes the processing for all additional functions (S206: Yes), it changes the priority of the additional function table according to the processing result (processing E: refer to FIG. 20).

Foremost, the file system management program 13 refers to the processing result table 32 (S219). The file system management program 13 updates the additional function table 32 based on the processing result table 32.

Here, the file system management program acquires, from the additional function table, the respective priorities of the additional functions in which the expansion of capacity ended in a failure which are entered in the processing result table 32, and arranges the additional functions in descending order of priority. Then, the file system management program re-assigns the priorities to the arranged additional functions so that the higher additional functions are given preference in the allocation of storage capacity, and reflects the result in the additional function table (S220, S221). The subsequent processing is the same as the processing of S109 and S10 described in the first embodiment.

According to this embodiment, if an administrator attempts to expand or expands the file system that is set with additional functions and there is shortage in capacity that is required for the additional functions, the main computer 10 coordinates with the storage apparatus 20 to create a volume and set a path appropriately. Accordingly, the storage apparatus 20 is able to acquire a storage capacity that is required for expanding the additional functions from the storage device and automatically allocate it to the inner real volume corresponding to the additional function volume 103.

As described above, when the computer 10 expands the file system, since the reservation of the capacity required for the additional functions is synchronized, a situation where the additional function is unable to operate after the expansion of the file system can be prevented from occurring. Further, as a result of the additional function table 16 including a priority 164, and arranging the additional functions in descending order of the priority 164 at S205, the capacity is expanded in order from the additional function with the highest priority for the administrator.

Moreover, by raising the priority of the additional functions in which the capacity could not be expanded in the course of the file system expansion processing, the computer 10 is able to preferentially expand the capacity of that additional function upon performing the subsequent file system expansion processing.

[Third Embodiment]

The file system management program 13 of the computer 10 periodically monitors whether there is unused capacity where files are not stored in the file system, and, if there is any insufficiency in the unused capacity, expands the file system according to the priority set forth by the administrator.

Figure 12:
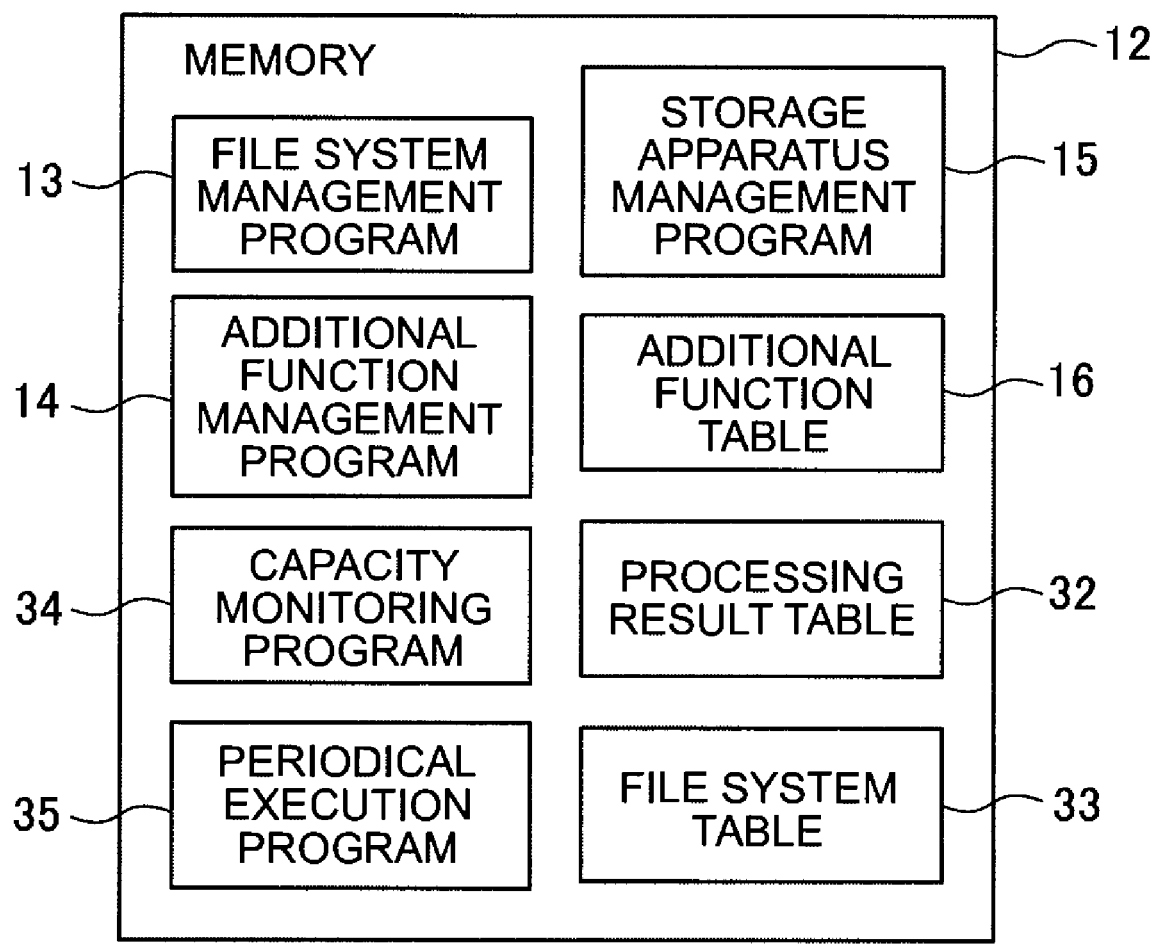
FIG. 12 is a block diagram according to a second example of a memory of a main computer.

FIG. 12 is a block diagram according to a second example of the memory 12 of the main computer 10. The memory 12 comprises, in addition to the management information shown in FIG. 1, a file system table 33, a capacity monitoring program 34, and a periodical execution program 35. The capacity monitoring program 34 possesses the function of determining whether a threshold value is applicable in relation to the file system.

The periodical execution program 35 possesses the function of periodically executing the capacity monitoring program 34, and cron corresponds to this in a standard UNIX (registered trademark).

FIG. 13 shows an example of the file system table 33. The file system table 33 includes a file system name 331, a priority 332 of the file system, a threshold value 333 for determining whether to expand the file system, and an expansion capacity 334 to be selected when expanding the file system.

As an example of the threshold value 333, a ratio (%) of the unused capacity in relation to the current capacity of the file system, ratio of the capacity (used capacity) storing data (FIG. 13), and the unused capacity/used capacity (number of bytes) of the file system can be preferably used. As an example of the expansion capacity 334, a ratio (%) or the number of bytes in relation to the current capacity of the file system can be preferably used.

Figure 14:
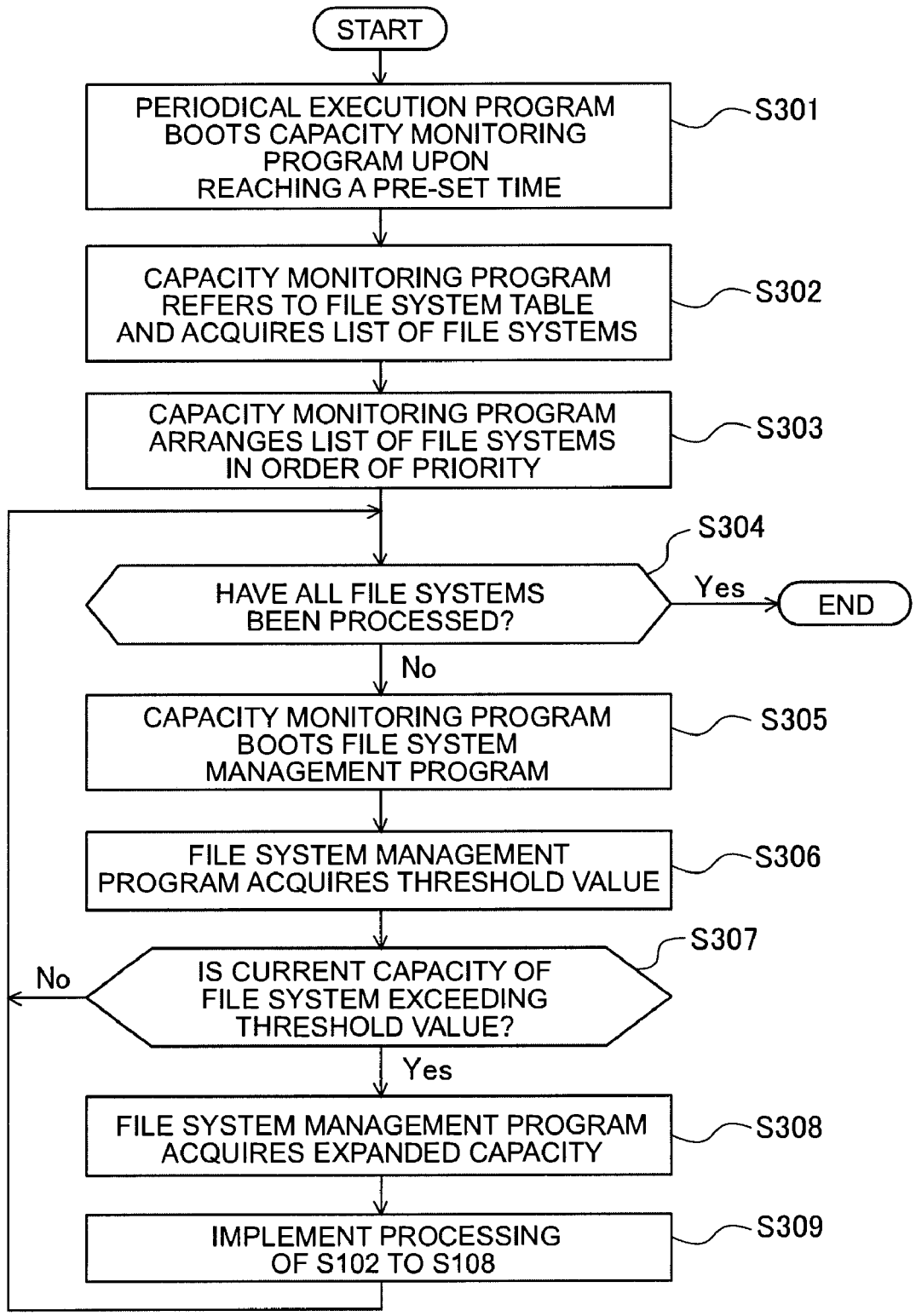
FIG. 14 is a flowchart showing the routine for expanding the file system according to the priority set forth by the administrator.

FIG. 14 is a flowchart showing the routine for expanding the file system according to the priority set forth by the administrator. The periodical execution program 35 boots the capacity monitoring program 34 upon reaching a pre-set time (S301).

The booted capacity monitoring program 34 refers to the file system table 33 and acquires a list of the file systems (S302). The capacity monitoring program 34 arranges the acquired list of file systems in the order of the priority 332 (S303). Subsequently, the capacity monitoring program 34 implements the processing of S305 to S309 to all additional functions that were arranged at S303 (S304).

Foremost, the capacity monitoring program 34 boots the file system management program 13 (S305). The file system management program 13 refers to the file system table 33 and acquires the threshold value 333 of the file system (S306).

The file system management program 13 acquires the capacity that is being used by the client or the user with files recorded therein among the capacities of the file system, and checks whether such capacity exceeds the threshold value 333 (S307).

If the capacity is not exceeding the threshold value 333 (S307: No), the file system monitoring program returns to S304. If the capacity is exceeding the threshold value 333 (S307: Yes), the file system management program 13 acquires the expansion capacity 334 of the file system (S308).

The file system management program 13 implements the processing of S102 to S108 described above (S309), and then returns to S304. Here, as the expansion capacity to be used at S102, the expansion capacity 334 acquired at S308 is used.

According to this embodiment, the file system management program periodically monitors the capacity of the file system, and expands the file system if there is insufficiency in the capacity of the file system. Moreover, since the file system table 33 includes a priority 332 and arranges the file systems in the order of the priority 334 at S303, the capacity is expanded in order from the file system with the highest priority for the administrator.

[Embodiment 4]

If the remote copy source computer is to transfer data of the file system to a file system of one or more remote copy destination computers connected via a remote line and there is insufficient capacity in the remote copy destination file system, the remote copy destination computer expands the file system.

Figure 15:
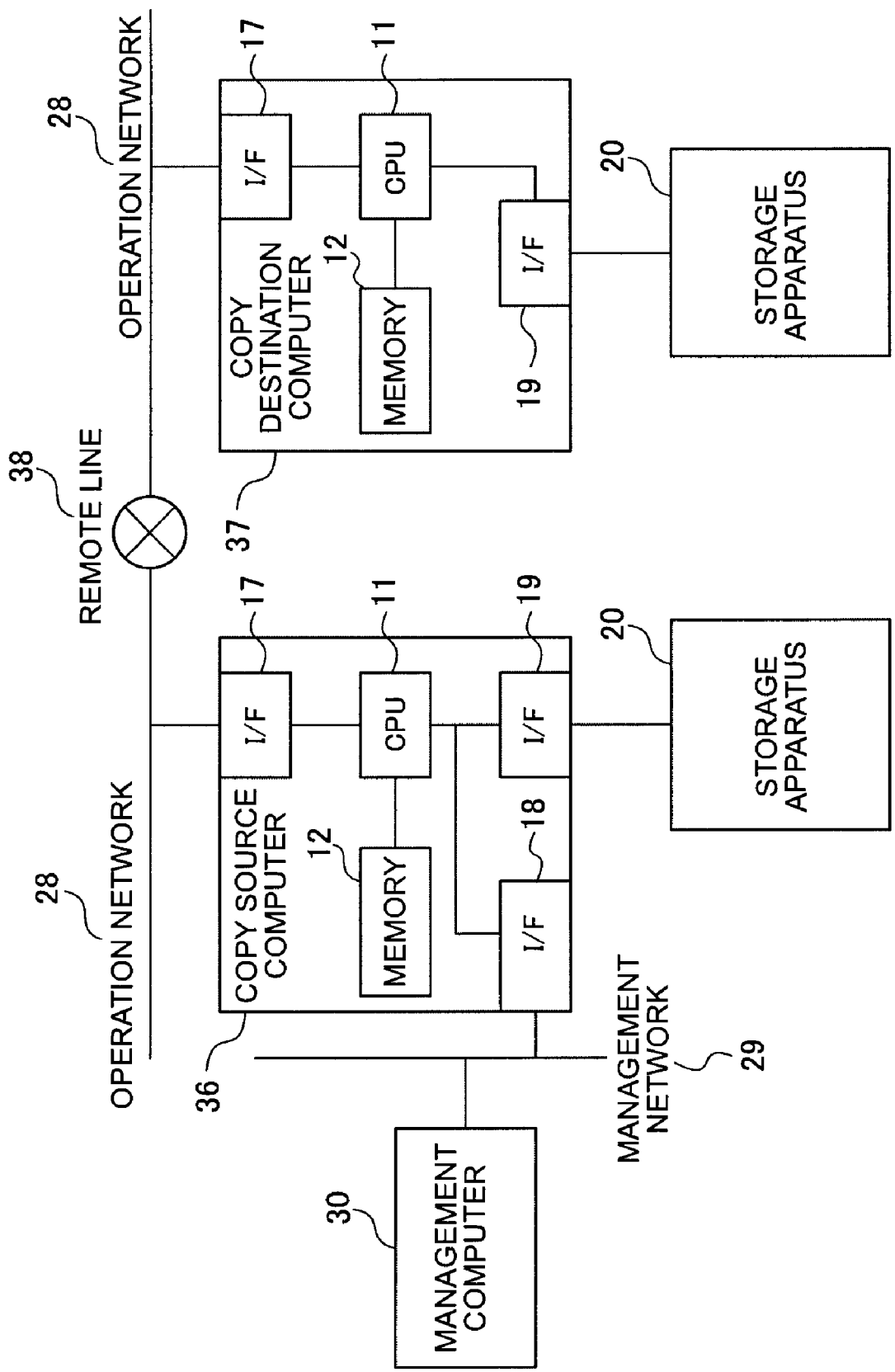
FIG. 15 is a hardware block diagram according to an example of a remote copy system to which the present invention is applied.

FIG. 15 is a block diagram of a computer system for achieving the above. The copy source computer 36 and the copy destination computer 37 are connected via a remote line 38. A plurality of copy destination computers 37 may be provided. Incidentally, the flowchart explained later is based on the premise that there are a plurality of copy destination computers 37.

Figure 16:
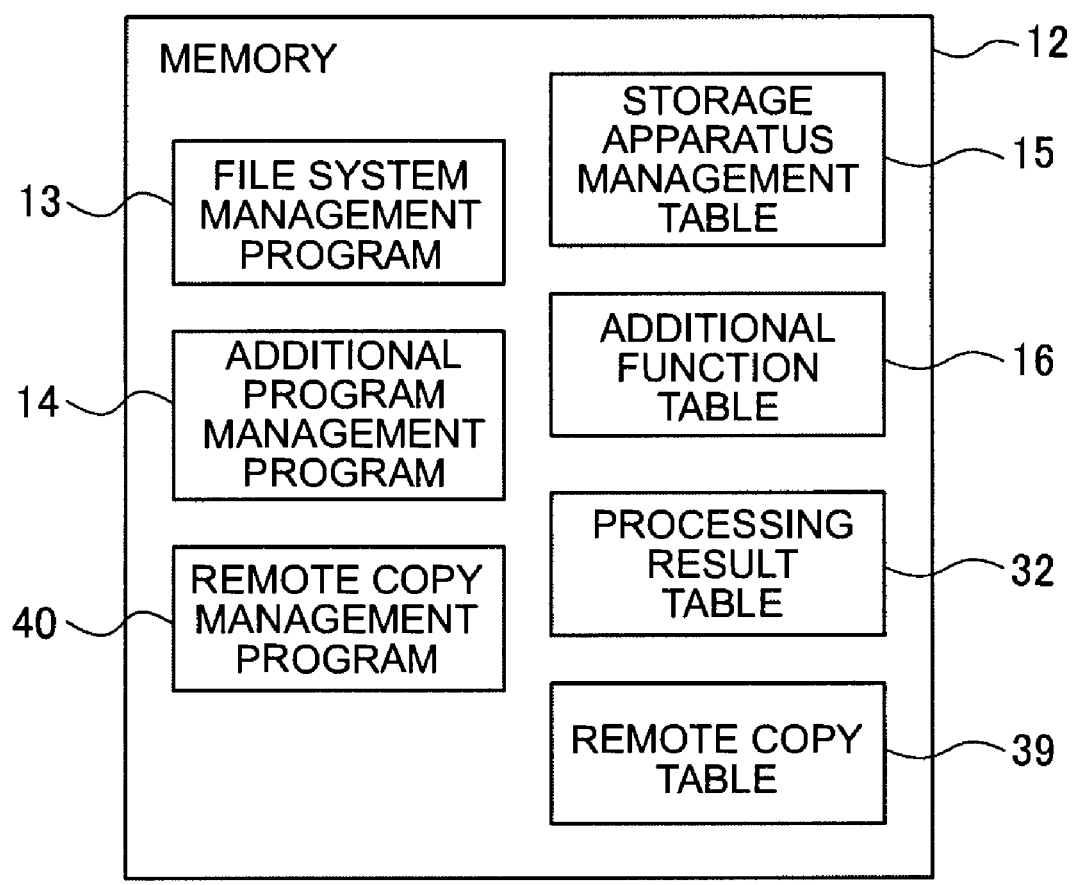
FIG. 16 is a block diagram showing a memory of a copy destination computer and a copy source computer.

FIG. 16 is a block diagram showing the memory 12 of the copy destination computer and the copy source computer. The memory 12 includes, in addition to the management elements explained in the first embodiment, a remote copy table 39 and a remote copy management program 40.

FIG. 17 shows an example of the remote copy table 39. The remote copy table 39 includes at least information of a file system name 391, and a copy destination computer 392 to become the target of data transfer of the file system. As an example of information of the copy destination computer 392, an IP address or a host name of the copy destination computer is preferably used. If data of the file system is to be transferred to a plurality of computers, a plurality of copy destination computers 392 may be provided for each file system.

Figure 18:
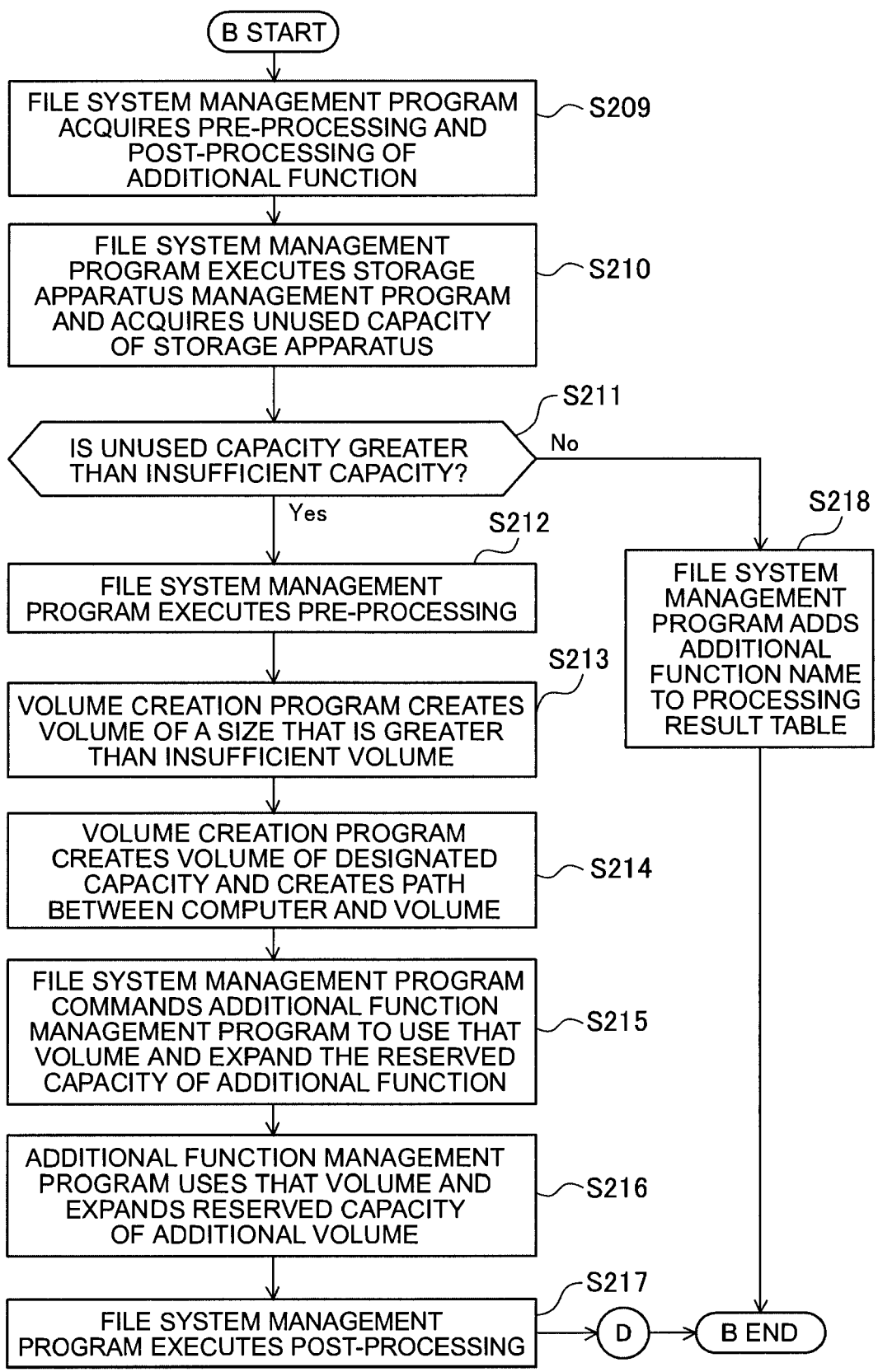
FIG. 18 is a first flowchart showing a processing routine for expanding a transfer destination file system in the remote copy system.

FIG. 18 is a flowchart showing the processing routine for expanding the transfer destination file system in the remote copy system. The file system management program of the remote destination computer executes the respective steps of FIG. 10 described above, and thereafter executes the same processing as S209 to S217 of FIG. 11, and thereafter implements processing D.

Figure 19:
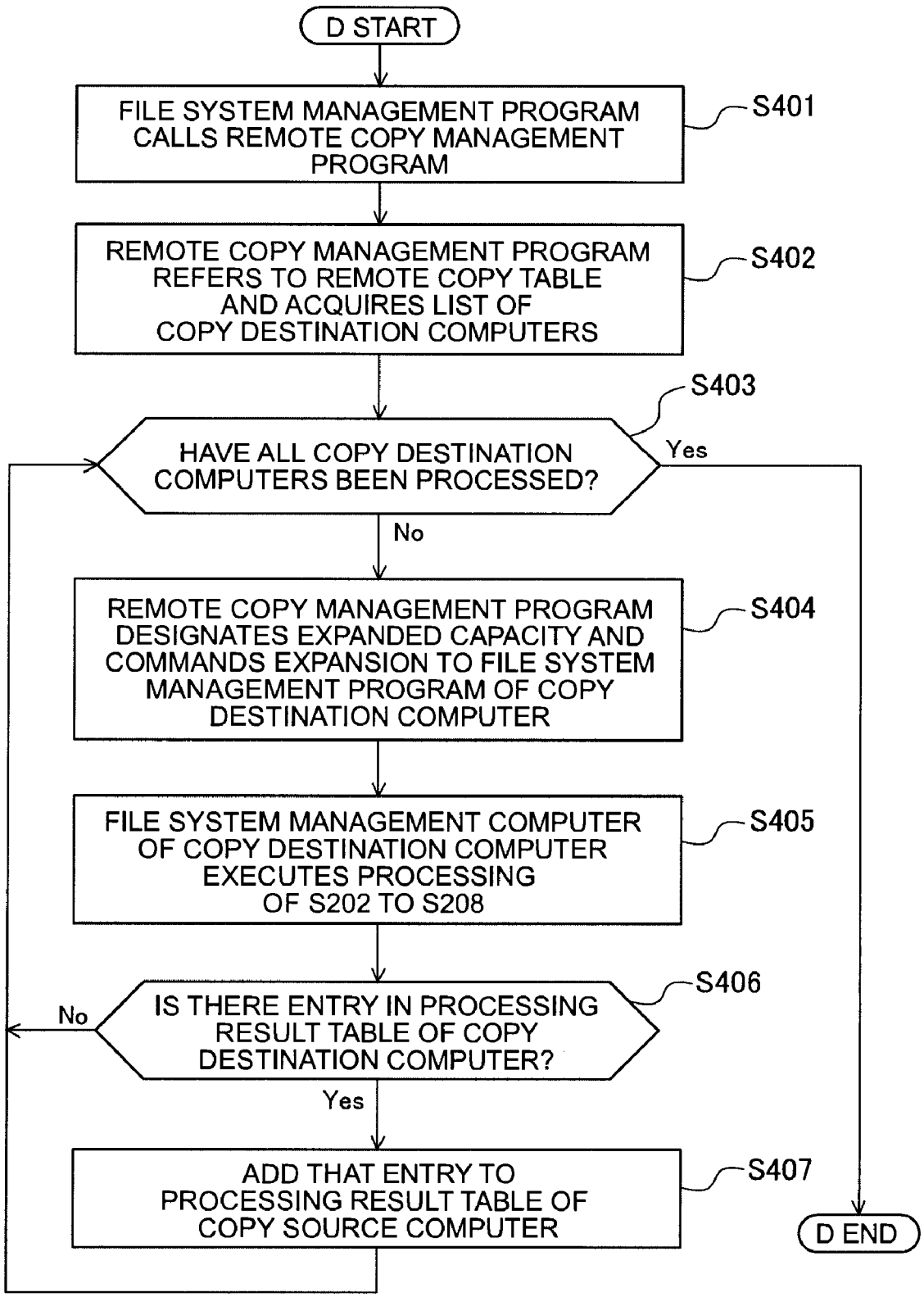
FIG. 19 is a second flowchart to be connected to the first flowchart of FIG. 18.

FIG. 19 is a flowchart showing processing D. When the file system is expanded in the copy source computer, the expansion of the file system of the copy destination computer is subsequently performed. In the copy destination computer, the expansion of the capacity of the additional functions is performed in accordance with the expansion of the capacity of the file system.

The file system management program 13 of the copy source computer 36 executes the remote copy management program 40 (S401). The remote copy management program 40 refers to the remote copy table 39 and acquires a list of the copy destination computers (S402).

The processing of S404 to S407 regarding all copy destination computers acquired at S402 is implemented (S403). The remote copy management program 40 commands the file system management program of the copy destination computer to expand the capacity designated by the administrator (S404).

Subsequently, the file system management program 13 of the copy destination computer executes the processing of S202 to S218 (S405). When the processing of S206 is complete, since the processing result table 32 is created in the copy destination computer (S218), the remote copy management program 40 acquires the processing result table 32 (S406).

If there is no entry in the processing result table 32 (S406: No), the routine returns to S403. If there is any entry in the processing result table 32 (S406: Yes), since this means that there is an additional function that could not be expanded in the copy destination computer, the contents of the processing result table 32 of the copy destination computer are added to the processing result table 32 of the copy source computer (S407), and the routine returns to S403. As a result of the foregoing process, processing B is completed in addition to processing D.

According to this embodiment, when transferring data of a file system of one computer to a file system of another computer connected via a remote line, since the file system of the other computer and the capacity of the additional function can be expanded, remote copy from the copy source computer to the copy destination computer can be realized while maintaining the additional functions in the copy destination computer.

Incidentally, the storage apparatus 20 and the main computer 10 can be configured as an integral hardware configuration.

What is claimed is:

1. A file control system, comprising:
    a client computer;
    a storage medium for storing client data; and
    a main computer including:
        a file system for managing reading and writing of data between the client computer and the storage medium,
        a control circuit for controlling the file system, and
        a memory circuit for storing management information of the file system,
    wherein the memory circuit stores setting information having a plurality of entries each including:
        an additional function of the file system,
        a condition for operating the additional function,
        a prescribed storage capacity allocated from the storage medium, and
        a priority of the additional function,
    wherein, upon expanding the file system based on the management information, the control circuit is configured to determine a status of fulfillment of the condition in the expanded file system, and to output warning information if the determination result denies fulfillment of the condition,
    and
    wherein the control circuit is configured to determine a status of fulfillment of the condition for each of the plurality of entries, and to allocate the storage area to the additional function in each of the plurality of entries whose fulfillment of the condition was denied in descending order of the priority of the additional functions.

2. The system according to claim 1, wherein the control circuit is further configured to:
    execute expansion of the file system by expanding a first storage capacity that is allocated from the storage medium to a first volume for reading and writing the data, and
    determine a status of fulfillment of the condition by allocating a second storage capacity from the storage medium to a second volume for the additional function and referring to the expanded first storage capacity and the second storage capacity.

3. The system according to claim 2, wherein the control circuit is configured to deny fulfillment of the condition if the second storage capacity is less than the expanded first storage capacity.

4. The system according to claim 1, wherein, if the control circuit denies fulfillment of the condition, the control circuit is configured to allocate a storage area from the storage medium to the additional function.

5. The system according to claim 1, wherein the control circuit is configured to:
  determine an unused capacity of the storage medium, and availability of allocation of the storage capacity, and
  register priority of the entry in which allocation of the storage capacity was denied to be higher than the original priority in the setting information.

6. The system according to claim 1, wherein the main computer comprises a plurality of the file systems,
  wherein the memory circuit is configured to store second setting information set with a threshold value and a priority regarding each of the plurality of file systems, and
  wherein the control circuit is configured to compare a storage capacity of that file system and the threshold value in order of the priority regarding the plurality of file systems, and expand a storage capacity of a file system in which the storage capacity is within the scope of the threshold value.

7. A file control system, comprising:
  a client computer;
  a storage apparatus including a storage device for storing client data;
  a main computer including:
    a file system for managing reading and writing of data between the client computer and the storage device,
    a control circuit for controlling the file system, and
    a memory circuit for storing management information of the file system; and
  a management computer for providing a GUI of the file system management to an administrator;
  wherein the memory circuit stores setting information having a plurality of entries each including:
    an additional function of the file system,
    a condition for operating the additional function,
    a prescribed storage capacity allocated from the storage device, and
    a priority of the additional function,
  wherein, upon expanding the file system based on the management information, the control circuit is configured to determine a status of fulfillment of the condition in the expanded file system, and outputs warning information if the determination result denies fulfillment of the condition,
  wherein the control circuit is configured to execute expansion of the file system by expanding a first storage capacity that is allocated from the storage device to a first volume for reading and writing the data, and to determine a status of fulfillment of the condition by allocating a second storage capacity from the storage device to a second volume for the additional function and referring to the expanded first storage capacity and the second storage capacity,
  the control circuit is configured to determine an unused capacity of the storage device and to determine availability of allocation of the storage capacity and registers priority of the entry in which allocation of the storage capacity was denied to be higher than the original priority in the setting information,
  wherein the management computer is configured to send an expansion amount of the primary volume to the main computer, and
  wherein the control circuit is configured to determine a status of fulfillment of the condition for each of the plurality of entries, and to allocate the storage area to the additional function in each of the plurality of entries whose fulfillment of the condition was denied in descending order of the priority of the additional function.

8. A file control computer, comprising:
  a first interface with a first network connected to a client computer;
  a second interface with a second network connected to a storage apparatus including a storage medium for storing client data; and
  a main computer including:
    a file system for managing reading and writing of data between the client computer and the storage apparatus,
    a control circuit for controlling the file system, and
    a memory circuit for storing management information of the file system,
  wherein the memory circuit stores setting information having a plurality of entries each including:
    an additional function of the file system,
    a condition for operating the additional function,
    a prescribed storage capacity allocated from the storage medium, and
    a priority of the additional function,
  wherein, upon expanding the file system based on the management information, the control circuit is configured to determine a status of fulfillment of the condition in the expanded file system, and to output warning information if the determination result denies fulfillment of the condition, and
  wherein the control circuit is configured to determine a status of fulfillment of the condition for each of the plurality of entries, and allocate the storage area to the additional function in each of the plurality of entries whose fulfillment of the condition was denied in descending order of the priority of the additional functions.

* * * * *